June 3, 1958 — W. M. SORBORO — 2,837,098
DENTAL FLOSS HOLDER AND DISPENSER
Filed Jan. 10, 1956
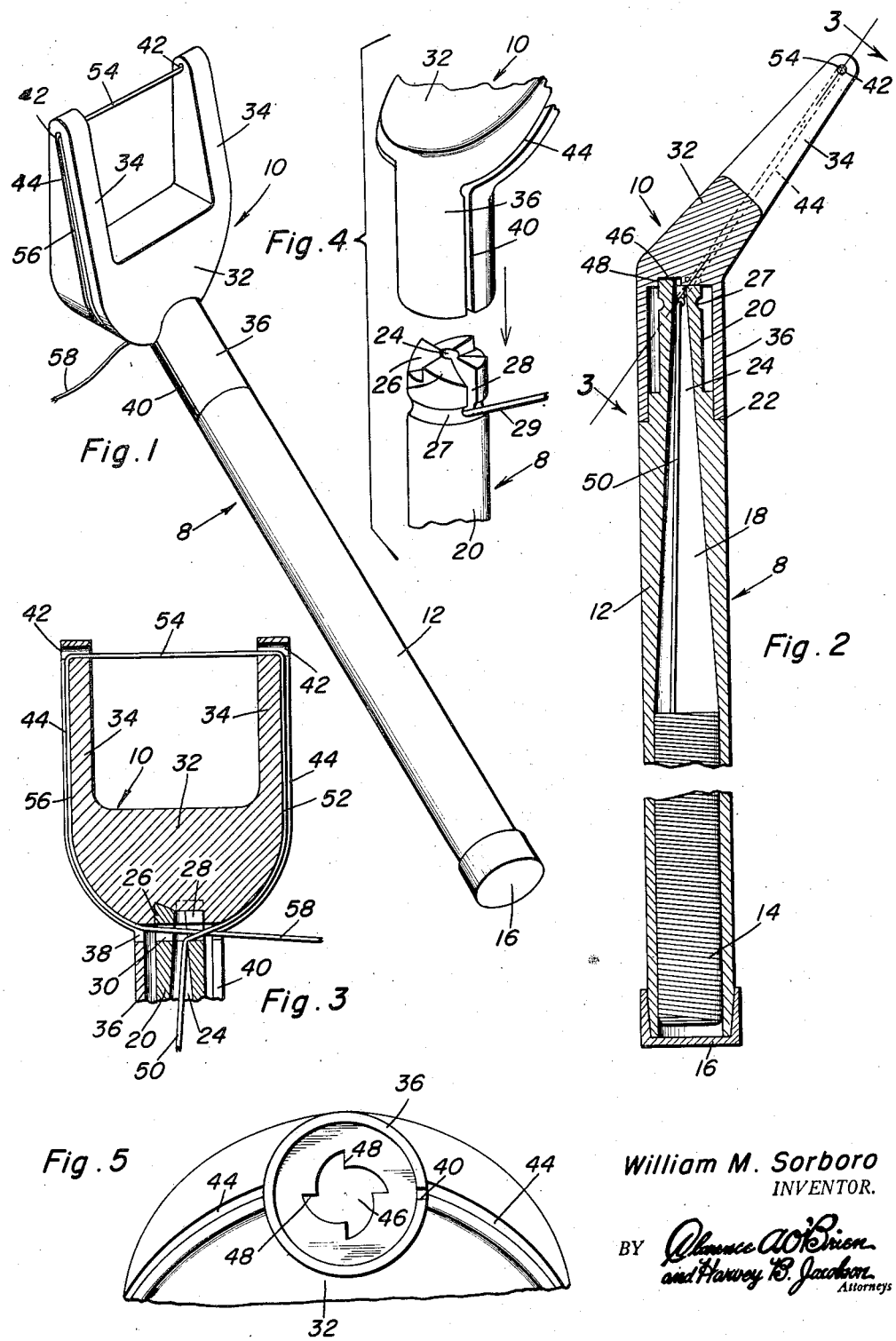
William M. Sorboro
INVENTOR.

United States Patent Office 2,837,098
Patented June 3, 1958

2,837,098
DENTAL FLOSS HOLDER AND DISPENSER
William M. Sorboro, Kent, Ohio
Application January 10, 1956, Serial No. 558,268
3 Claims. (Cl. 132—92)

The present invention relates to a novelly constructed and performing hand instrument which is expressly constructed to serve as a holder, dispenser and applicator for a spool or equivalent supply of dental floss.

Briefly, the invention in its preferred form is characterized by a hollow handle defining a chamber in which the supply of dental floss is manually placed and contained and from which it is dispensed in a step-by-step manner. A specially designed and constructed unit is attached to the outer end of the handle and is constructed to provide a fork. The fork, in turn, is so constructed that it permits a predetermined usable portion of the dental floss to be stretched tautly between the outer ends of the fork arms for handy and effectual use in a reliable and satisfactory manner.

More specifically, the handle provides one unit and is the holder and dispenser and the fork, generally speaking, is the second unit and has a socket member which telescopically receives the cooperating outer end of the handle, whereby to provide a separable but reliable coupling between the two units.

The general object of the invention is to structurally, functionally and otherwise improve upon prior art holders and dispensers and, in carrying out the invention, the separably coupled portions of the respective units are provided with novel and practical means whereby a reduced shank on the outer end of the handle has ratchet teeth to engage ratcheting and retaining shoulders incorporated in the body of the fork unit to thus provide slack take-up clutch means functioning to tension and tauten a portion of the dental floss bridging the space between the fork arms and to thus ready it for accessible and reliable use.

Other objects, features and advantages will become more readily apparent from the following description and the accompanying sheet of drawings.

In the drawings, wherein like numerals are employed to designate like parts throughout the views:

Figure 1 is a perspective view of a dental floss holder and dispenser constructed in accordance with the principles of the present invention showing the same strung and ready for use;

Figure 2 is an enlarged but foreshortened view of the same emphasizing the details of the over-all construction;

Figure 3 is a section on the line 3—3 of Figure 2, looking in the direction of the arrows;

Figure 4 is an exaggerated "exploded" perspective view detailing certain essential structural characteristics; and Figure 5 is an exaggerated fragmentary elevational view of the fork unit detailing the socket and its construction.

Referring now to the drawings with the aid of reference numerals and lead lines there are first and second units denoted generally by the numerals 8 and 10, respectively. These may also be alternatively described as a handle unit 8 and a fork unit 10. The handle unit is linearly straight and tubular in form and is thought of as a hollow handle, the same being denoted specifically by the numeral 12. In practice, the handle will be made of stainless steel or rigid commercial plastics and it will be noticed in Fig. 2 that it is open at the bottom to permit the spool or supply 14 of dental floss to be inserted. This is kept in place by a removable friction-fitted or equivalent closing cap 16. The hollow portion or bore of the handle constitutes a chamber 18 for the dental spool 14. The outer or upper end of the handle is reduced in cross-section to define an axial part which is here described as a shank 20. This is so constructed that it provides a shoulder 22. It is preferably cylindrical in cross-section and has a gradually tapering bore 24 which opens through the outer end as shown best in Fig. 4. In the last-named figure it will also be seen that the outer end is provided with what may be described as a ratchet head, the cam-like ratchet teeth of which are circumferentially spaced and denoted by the numeral 26. There is a circumferential channel or groove 27 for winding and wrapping of the complemental portion of the dental floss. Also, there is a notch or slot 28 which opens through the ratchet head and through one side of the shank. This is an outlet for the free end portion 29 of the dental floss. As seen in Fig. 3, there is also a diametrically opposite hole 30 to be later referred to.

The second or fork unit 10 is a one-piece construction and also of suitable material and rigid and is characterized by a body 32 having a fork formed on one side and the fork arms denoted by the numeral 34. On the other side there is a socket member 36 having a restricted hole 38 (see Fig. 3) in one side which is adapted to be aligned with the hole 30 and also the slot 28. There is also a lengthwise slot 40 in this sleeve or socket member 36 and it is diametrically opposite to the hole 38 and is alignable with the holes 30, 38 and the slot 28, that is, when the device is assembled and ready for tightening and use. The outer terminal ends of the fork arms are provided with holes 42. The outer side surfaces of the fork arms are provided with grooves 44. At the juncture of the socket member and body portion 32 the body portion is provided with an axial recess 46 which, as shown in Fig. 5, is marginally provided with circumferentially spaced equidistant check or stop shoulders 48. It will be noticed that the slot 40 is in line with the adjacent end portion of the cooperating groove 44.

In practice, the cap 16 is removed and the cartridge or supply, sometimes called a spool, 14 of dental floss is placed in position and ready for use. The free end portion is unwound and passed up through the bore 18 and passage 24 as at 50. It is then threaded through the slot or notch 28 (see Fig. 3) and carried up through the right-hand groove or channel 44 as at 52. It is then threaded through the right-hand hole 42 in the fork arm 34 and drawn across the space between the fork arm as at 54 and then threaded through the hole 42 in the left fork arm 34 and is carried back down through the left-hand groove 44 as at 56. Assuming that the two units 8 and 10 have been properly assembled with the holes suitably lined up, the terminal or free end portion 58 is threaded first through the hole 38, through the hole 30 back through the slot 28 and finally out through the slot 40 where it is free to catch hold of with the fingers. Obviously, by now rotating the fork unit 10 relative to the handle unit 8 in the proper direction ratcheting clutch-like means comes into play and causes the dental floss to be wound several turns around the groove or channel 27. This takes up the slack and tensions and tautens the portion 54 which is then ready for use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A holder and dispenser for dental floss comprising two essential cooperating units, namely, a first unit characterized by a hollow handle providing a chamber in which the supply of dental floss is contained and from which a free end portion of the same is progressively withdrawn and readied for accessible use, and a second companion unit embodying a body having a fork on one side and a socket member on the other side, the adjacent outer end of said handle being fitted telescopically and removably into the socket portion of said socket member, said outer end portion having a ratchet-equipped head and said body having a recess aligned with and into which said head is fitted for rotation, said recess having marginal circumferentially spaced shoulders with which the ratchet teeth on said head are releasably and retentively cooperable.

2. A holder and dispenser for dental floss comprising two essential cooperating units, namely, a first unit characterized by a hollow handle providing a chamber in which the supply of dental floss is contained and from which a free end portion of the same is progressively withdrawn and readied for accessible use, said handle having an outer end portion which is reduced in cross-section to define a shank and a shoulder at the inner end of said shank, the outer end of said shank having circumferentially spaced ratchet teeth, having an endless circumferential groove, having a slot extending from said groove and opening through the outer end of said shank and said shank also having an axial bore providing a dental floss passage leading from said chamber to and communicating with said slot, and a second unit cooperable with said first unit and embodying a body having a fork on one side and a slotted socket member on the other side, said fork embodying spaced arms having free terminal ends provided with holes aligned with each other and arranged to permit a portion of the dental floss to be threaded therethrough so that the portion of the dental floss bridging the space between said arms may be drawn taut for effectual and handy use, said shank fitting telescopically and removably into the socket portion of said socket member, said body having a recess in alignment with the ratchet teeth and into which said teeth project for rotation, said recess having marginal circumferentially spaced check shoulders with which said teeth are releasably and retentively cooperable, and said socket member and shank also having alignable holes for passage of cooperating portions of said dental floss.

3. A holder and dispenser for dental floss comprising two essential cooperating units, namely, a first unit characterized by a hollow handle providing a chamber in which the supply of dental floss is contained and from which a free end portion of the same is progressively withdrawn and readied for accessible use, and a second unit embodying a fork having spaced arms having free terminal ends provided with holes aligned with each other and arranged to permit a portion of the dental floss to be threaded therethrough so that the portion of the dental floss bridging the space between said arms may be drawn taut for effectual and handy use, and a socket member into which the adjacent outer end of said handle is telescopically and removably fitted, the outer end of said handle having clutch elements and an adjacent surface portion of the second unit having cooperating clutch elements, said clutch elements being rendered effective by axially twisting the handle relative to the fork or vice versa, said socket member having a hole in one side and a diametrically opposite slot, the outer end of said handle having an axial bore and a notch in communication with said bore, the bore and notch serving to render an end portion of the dental floss accessible, said notch being alignable with said slot, and said outer end also having a hole therein in alignment with the notch and also with the hole in said socket member.

References Cited in the file of this patent

UNITED STATES PATENTS

| | | |
|---|---|---|
| 1,468,942 | Gamble | Sept. 25, 1923 |
| 1,588,307 | Cammack | June 8, 1926 |
| 1,661,472 | Gilbert | Mar. 6, 1928 |
| 2,467,221 | Pastl | Apr. 12, 1949 |
| 2,697,370 | Brooks | Dec. 21, 1954 |
| 2,707,893 | Bohnet | May 10, 1955 |
| 2,735,437 | Coyle | Feb. 21, 1956 |